United States Patent [19]
Swanson

[11] 3,753,308
[45] Aug. 21, 1973

[54] MINNOW DIPPER AND HOLDER
[76] Inventor: Harold E. Swanson, Rt. 1, Box 62, Waverly, Minn. 55390
[22] Filed: Dec. 2, 1971
[21] Appl. No.: 204,164

[52] U.S. Cl. ................................................ 43/4
[51] Int. Cl. ........................................... A01k 97/04
[58] Field of Search ......................... 43/4, 55, 54.5

[56]       References Cited
          UNITED STATES PATENTS
3,065,561  11/1962  Swanson ................................ 43/4
3,059,369  10/1962  Swanson ................................ 43/4
2,480,924   9/1949  Heger ..................................... 43/4
3,201,888   8/1965  Barbee ................................... 43/4
2,611,982   9/1952  Sears ..................................... 43/4

Primary Examiner—Russell R. Kinsey
Assistant Examiner—James H. Czerwonky
Attorney—Jack W. Wicks et al.

[57] ABSTRACT

A minnow dipper and holder including a cup-shaped body having an opening at the lower diminished end and a handle connected thereto. A first support depends from the cup-shaped body adjacent the opening with a multiplicity of longitudinally spaced and generally semi-circular segments extending therefrom and a second support is connected to an arm slidable on the handle. The second support also has a multiplicity of longitudinally spaced and generally semi-circular segments extending therefrom with an arm connected to said second support and slidably connected to and actuable on the handle. The second support is spaced from the first support along its entire length.

1 Claim, 3 Drawing Figures

PATENTED AUG 21 1973 3,753,308

INVENTOR.
HAROLD E. SWANSON
BY
Wicks & Nemer
ATTORNEYS

MINNOW DIPPER AND HOLDER

SUMMARY

The invention relates to an improvement in a minnow dipper and holder as shown in U.S. Pat. No. 3,065,561. In the present invention an arm is provided which has formed on one end thereof a second support with a multiplicity of segments. The arm is slidably mounted on a handle which mounts a cup-shaped body from which depends a first support with segments thereon. As the arm is slidably moved on the handle the second support is moved relative to the first support in parallel relation to thereby effectively clamp a minnow between the supports for insertion of a hook into the minnow or separate the supports and easily remove the minnow from between the segments of the supports.

In the drawings forming part of this application:

Figure 1:
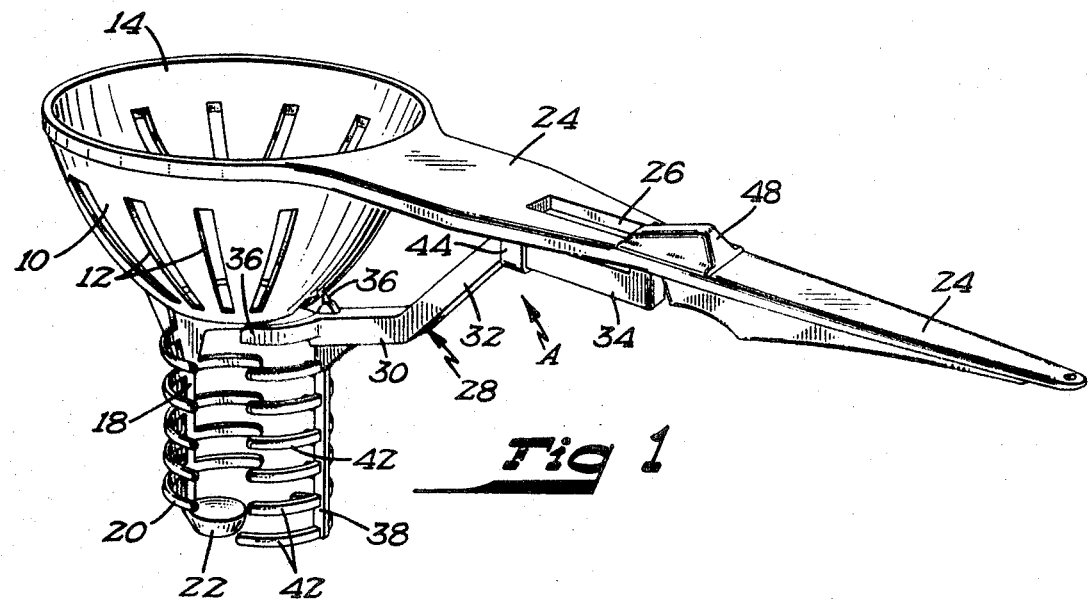
FIG. 1 is a perspective view of a minnow dipper and holder.
Figure 2:
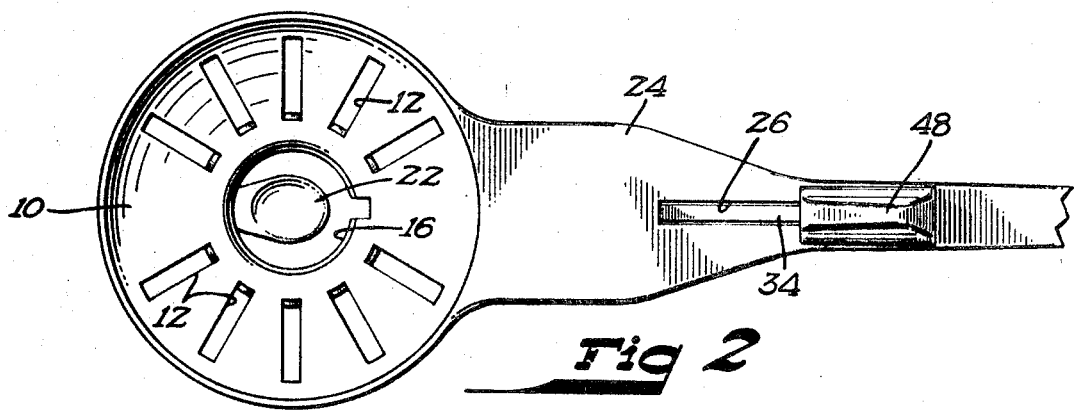
FIG. 2 is a top plan view.

Referring to the drawings in detail, the minnow dipper and holder A includes the cup-shaped body 10 formed with the drain slots 12 and the enlarged upper opening 14 together with the lower diminished opening 16. Further provided is the free ended support 18 which is connected to and depends from the lower portion of the cup body 10. The support 18 has secured thereto and extending therefrom the multiplicity of longitudinally spaced and generally semi-circular segments 20. Formed on the lower free end of the support 18 is the stop cup 22 which is in vertical axial alignment with the opening 16.

The numeral 24 designates a handle formed with the slot 26 and connected to the upper edge of the cup-shaped body 10. Further included is the arm 28 formed of the lower end portion 30, the angularly disposed intermediate portion 32 which terminates in the upper portion 34 substantially parallel to the lower end portion 30.

Formed on the outer end of the lower arm portion are the semi-circular segments 36 and depending from the end of the arm portion 30 is the depending support 38. The numeral 42 indicates a multiplicity of longitudinally spaced and generally semi-circular segments. The segments 20 of support 18 form half of a split cage and the segments 42 of the support 38 form a second half of the split cage. The extent of the support 38 is such that the lowermost segments 42 bypass the stop cup 22 and the segments in the support 38 and on support 18 are staggered so that the same bypass one another to close the cage C when the support 38 is moved toward the support 18, as set forth hereinafter. When the cage is closed the half portions thereof engage a minnow which is guided downwardly through the opening 16.

Figure 3:
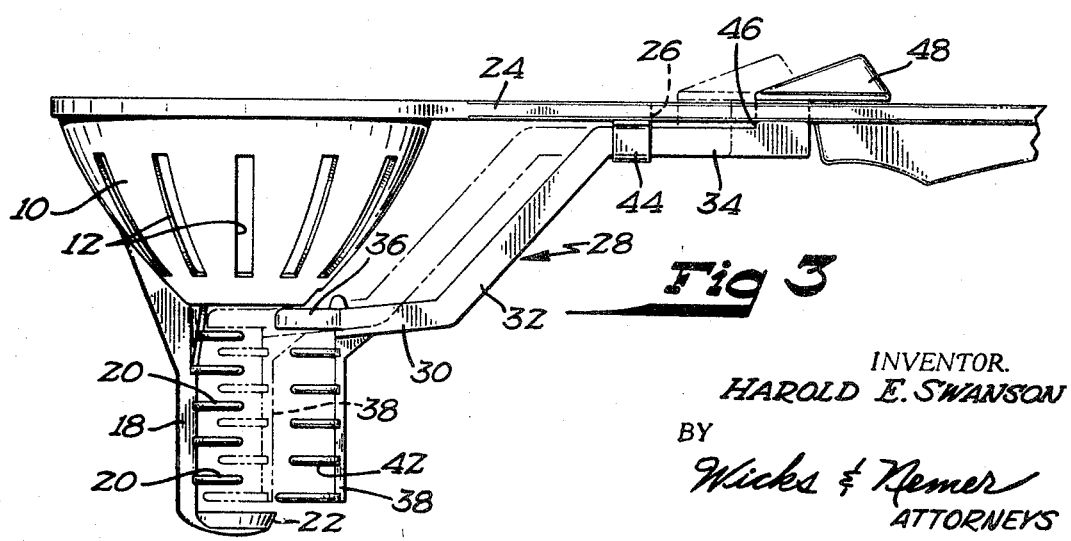
FIG. 3 is a side elevational view thereof.

The upper arm portion 34 is slidably mounted in the U-shaped bracket 44 connected to the underside of the handle 24, and formed in the outer free end portion of the arm portion 34 is the right angular portion 46 extended through the slot 26. Secured to the upper end of the right angular portion 46 is the operating button 48 which rides on the top surface of the handle 24. The length of the arm 28 is such that when the button 48 is slidably withdrawn to the rearward extent of the slot 26 the cage is opened by separating the segments 42 from the segments 20 as shown in FIGS. 1 and 3. When the button 48 is slidably moved in the opposite direction to the forward extent of the slot 26, the segments 42 move to positions within the segments 20 as in broken lines in FIG. 3. When the segments 42 are moved to a point adjacent the segments 20 and overlapping the same, the segments form a cage for clamping the minnow scooped into the cup body 10 from a pail of minnows and allowed to pass through the opening 16 to the cage C. With a minnow held firmly in the cage formation a hook may be easily engaged into the minnow. With proper engagement of a hook in the caged minnow, the button 48 is moved rearwardly in the slot 26 whereby the support 38 with the segments thereof is moved completely free from the support 18 and the segments 20 thereon so that a minnow may be easily released.

I claim:

1. A minnow dipper and holder comprising
   a. a cup-shaped body having an opening at the lower diminished portion,
   b. a handle formed on said cup-shaped body,
   c. a first support depending from said cup-shaped body adjacent said opening,
   d. said first support having a multiplicity of longitudinally spaced and generally semi-circular segments extending therefrom,
   e. a second support,
   f. a multiplicity of longitudinally spaced and generally semi-circular segments extending therefrom,
   g. a rigid arm slidably mounted on said handle and rigidly connected to said second support, said second support being in spaced parallel relation to said first support along its entire length for moving said second support toward said first support to form a split cage with said segments for engaging a minnow and from said first support in parallel relation to allow removal of a minnow from the cage at the lower ends thereof.

* * * * *